US005665840A

United States Patent [19]

Pöhlmann et al.

[11] Patent Number: 5,665,840
[45] Date of Patent: Sep. 9, 1997

[54] POLYMERIC NETWORKS FROM WATER-SOLUBLE PREPOLYMERS

[75] Inventors: Thomas Pöhlmann, Niedernberg; Achim Müller, Aschaffenburg; Bernhard Seiferling, Goldbach, all of Germany

[73] Assignee: Novartis Corporation, East Hanover, N.J.

[21] Appl. No.: 552,649

[22] Filed: Nov. 3, 1995

[51] Int. Cl.$^6$ .................. C08F 26/10; C08L 39/06
[52] U.S. Cl. .................. 526/264; 526/323.2; 526/330; 526/331; 526/333; 523/106; 523/108
[58] Field of Search .................. 526/264, 330, 526/331, 333, 323.2; 523/108, 105, 106

[56] References Cited

U.S. PATENT DOCUMENTS

| | | | |
|---|---|---|---|
| 3,949,021 | 4/1976 | Kunitomo et al. | 260/895 |
| 4,123,408 | 10/1978 | Gordon | 260/29.6 |
| 4,361,689 | 11/1982 | Patel | 526/264 |
| 4,536,554 | 8/1985 | Lim et al. | 526/264 |
| 4,620,954 | 11/1986 | Singer et al. | 523/108 |
| 4,699,934 | 10/1987 | Ohkado | 523/108 |
| 5,155,194 | 10/1992 | Kossmehl | 523/108 |
| 5,236,969 | 8/1993 | Kungler | 523/108 |
| 5,426,163 | 6/1995 | Buehler | 526/264 |

FOREIGN PATENT DOCUMENTS

| | | |
|---|---|---|
| 2372452 | 11/1977 | European Pat. Off. . |
| 0321403 | 12/1988 | European Pat. Off. . |
| 0589430A2 | 9/1993 | European Pat. Off. . |

OTHER PUBLICATIONS

Production of Soft Contact Lens, vol. 13, #29 (C–562) (3377) Jan. 23, 1989.

*Primary Examiner*—Paul R. Michl
*Assistant Examiner*—Olga Asinovsky
*Attorney, Agent, or Firm*—Edward McC. Roberts; R. Scott Meece; Michael U. Lee

[57] ABSTRACT

The present invention describes a water-soluble crosslinkable prepolymer that comprises, in the copolymer chain, units derived from the following monomeric structural units: a vinyl lactam (a), vinyl alcohol (b), optionally a lower alkanecarboxylic acid vinyl ester (c), a vinylic crosslinking agent (d) and optionally a vinylic photoinitiator (e); a process for the preparation of the novel prepolymers; crosslinked water-insoluble polymeric networks therefrom; hydrogels and moulded articles made from the crosslinked water-insoluble polymeric networks, especially contact lenses; and a process for the manufacture of hydrogels and finished contact lenses using the mentioned crosslinkable water-soluble prepolymers.

32 Claims, No Drawings

POLYMERIC NETWORKS FROM WATER-SOLUBLE PREPOLYMERS

The present invention describes a water-soluble crosslinkable prepolymer that comprises, in the copolymer chain, units derived from the following monomeric structural units: a vinyl lactam (a), vinyl alcohol (b), optionally a lower alkanecarboxylic acid vinyl ester (c), a vinylic crosslinking agent (d) and optionally a vinylic photoinitiator (e); a process for the preparation of the novel prepolymers; crosslinked water-insoluble polymeric networks therefrom; hydrogels and moulded articles made from the crosslinked water-insoluble polymeric networks, especially contact lenses; and a process for the manufacture of hydrogels and finished contact lenses using the mentioned crosslinkable water-soluble prepolymers.

Vinyl lactam copolymers, for example vinylpyrrolidone copolymers, have for a long time been known as materials for contact lenses having a high water content. Representative examples that may be mentioned in this connection are Scafilcon A and Surfilcon A. They have proved very successful in practice because they are very comfortable to wear.

U.S. Pat. No. 4,347,198 describes the manufacture of contact lenses; a hydrophilic component, for example N-vinylpyrrolidone, a hydrophobic component, for example methyl methacrylate, a crosslinking agent and an initiator are mixed in a solvent, for example DMSO, and then the mixture is crosslinked in a mould. After extraction and equilibration in water, a soft hydrogel contact lens is obtained. Extraction with water is necessary because the solvent and unreacted vinyl monomers must be removed. Since a polymer swells to different degrees in, for example, DMSO on the one hand and water on the other hand, the contact lens does not assume its final size until equilibration.

EP 216 074 describes a process for the manufacture of hydrogel contact lenses. In that process, a polyvinyl alcohol modified with methacrylate is used, which is copolymerised in DMSO solution with vinyl monomers in a suitable casting mould, for example in the presence of a photoinitiator by irradiation with UV light for approximately 3 hours. After the contact lens has been removed from the mould, it is extracted with water or physiological saline in order to remove the DMSO and unreacted vinyl monomers. In this case too, the contact lens acquires its final geometry at the last stage on account of the differing effects of DMSO and water on its swelling.

Various attempts are being made to shorten the reaction times in the preparation of polymers in order to render the manufacture of lenses more efficient. EP 370 827 (Vistakon) describes, for example, the use of boric acid esters of particular difunctional alcohols as solvents for the polymerisation of, essentially, hydroxyethyl methacrylate (HEMA) in a polystyrene casting mould. The polymerisation again takes place in the presence of a photoinitiator by irradiation with UV light in only 6 to 12 minutes, and yields a gel which must then be extracted with water.

One disadvantage of the processes hitherto known for the manufacture of contact lenses is the lengthy extraction with water or physiological saline, which makes impossible the efficient manufacture of contact lenses with short cycle times.

Another disadvantage of the previous processes, as already mentioned, is the relatively low ram of crosslinking in the preparation of polymers in the prior art.

The present invention provides a solution in that respect. It discloses prepolymers that are both water-soluble and crosslinkable. The above-mentioned lengthy extraction with water or physiological saline after crosslinking is dispensed with in the present invention, since crosslinking can be carried out in, for example, water. The disadvantage of the relatively low rate of crosslinking is countered by using as starting materials for the manufacture of contact lenses not monomers but crosslinkable prepolymers.

Accordingly, the present invention relates to a water-soluble crosslinkable prepolymer that comprises, in the copolymer chain, units derived from the following monomeric structural units: a vinyl lactam (a), vinyl alcohol (b), optionally a lower alkanecarboxylic acid vinyl ester (c), a vinylic crosslinking agent (d) and optionally a vinylic photoinitiator (e).

Within the scope of the present Application, a water-soluble crosslinkable prepolymer is to be understood as being both a crosslinkable prepolymer and an uncrosslinked prepolymer.

The present invention relates preferably to a water-soluble crosslinkable prepolymer that comprises, in the copolymer chain, units derived from the following monomeric structural units:
from 5 to 85% by weight of a vinyl lactam (a),
from 3 to 80% by weight of vinyl alcohol (b),
from 0 to 65% by weight of a lower alkanecarboxylic acid vinyl ester (c),
from 3 to 40% by weight of a vinylic crosslinking agent (d) and
from 0 to 5% by weight of a vinylic photoinitiator (e).

The present invention also relates preferably to a water-soluble crosslinkable prepolymer that comprises, in the copolymer chain, units derived from the following monomeric structural units:
from 10 to 75% by weight of a vinyl lactam (a),
from 10 to 65% by weight of vinyl alcohol (b),
from 2 to 40% by weight of a lower alkanecarboxylic acid vinyl ester (c),
from 5 to 35% by weight of a vinylic crosslinking agent (d) and
from 0 to 3% by weight of a vinylic photoinitiator (e).

The present invention relates preferably to a water-soluble crosslinkable prepolymer that comprises, in the copolymer chain, units derived from the following monomeric structural units:
from 20 to 70% by weight of a vinyl lactam (a),
from 15 to 60% by weight of vinyl alcohol (b),
from 5 to 30% by weight of a lower alkanecarboxylic acid vinyl ester (c),
from 7 to 30% by weight of a vinylic crosslinking agent (d) and
from 0 to 2% by weight of a vinylic photoinitiator (e).

According to the invention, a vinyl lactarn (a) is to be understood as being, for example, a five- to seven-membered lactam of formula (I)

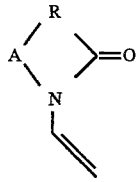

wherein
R is alkylene or alkenylene having from 2 to 8 carbon atoms that is linear or has one or more branches, and
A is CO or $CR^1R^2$, wherein $R^1$ is hydrogen, lower alkyl, aryl, aralkyl or alkaryl and $R^2$ is hydrogen or lower alkyl.

Some N-vinyl lactams (a) according to structural formula (I) above are N-vinyl-2-pyrrolidone, N-vinyl-2-piperidone, N-vinyl-2-caprolactam, N-vinyl-3-methyl-2-pyrrolidone, N-vinyl-3-methyl-2-piperidone, N-vinyl-3-methyl-2-caprolactam, N-vinyl-4-methyl-2-pyrrolidone, N-vinyl-4-methyl-2-caprolactam, N-vinyl-5-methyl-2-pyrrolidone, N-vinyl-5-methyl-2-piperidone, N-vinyl-5,5-dimethyl-2-pyrrolidone, N-vinyl-3,3,5-trimethyl-2-pyrrolidone, N-vinyl-5-methyl-5-ethyl-2-pyrrolidone, N-vinyl-3,4,5-trimethyl-3-ethyl-2-pyrrolidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-maleimide and N-vinyl-succinimide. If desired, mixtures thereof can also be used.

A vinyl lactam (a) that is preferably used is a heterocyclic monomer of formula I containing from 4 to 6 carbon atoms in the heterocyclic ring.

A vinyl lactam (a) that is preferably used is a heterocyclic monomer of formula I containing 4 carbon atoms in the heterocyclic ring.

A vinyl lactam (a) that is more preferably used is a heterocyclic monomer of formula I containing 4 carbon atoms in the heterocyclic ring, wherein $R^1$ is hydrogen or lower alkyl.

A vinyl lactam (a) that is also more preferably used is a heterocyclic monomer of formula I containing 4 carbon atoms in the heterocyclic ring, wherein $R^1$ and $R^2$ are each independently of the other hydrogen or lower alkyl.

A greatly preferred vinyl lactam (a) is N-vinyl-2-pyrrolidone.

The present invention relates preferably to a water-soluble crosslinkable prepolymer that comprises, in the copolymer chain, units derived from the following monomeric structural units: a vinyl lactam (a), vinyl alcohol (b), optionally a lower alkanecarboxylic acid vinyl ester (c), a vinylic crosslinking agent (d) and optionally a vinylic photoinitiator (e); wherein the amount by weight (based on the total weight of a prepolymer) of a monomeric structural unit (a) is at least 11% by weight.

Lower alkanecarboxylic acid vinyl esters (c) are to be understood as being, for example, heptanoic acid vinyl ester, hexanoic acid vinyl ester, pentanoic acid vinyl ester, butanoic acid vinyl ester, propanoic acid vinyl ester (vinyl propionate) or ethanoic acid vinyl ester (vinyl acetate). Mixtures of the mentioned vinyl esters (c) can also be used. Preferred lower alkanecarboxylic acid vinyl esters (c) are vinyl acetate, vinyl propionate and mixtures of the two.

A vinylic crosslinking agent (d) is to be understood as being, for example, a derivative of formula (II)

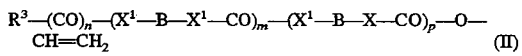

wherein $R^3$ is a radically polymerisable hydrocarbon group;

n, m and p are each independently of the others zero or 1;

the components B are each independently of the other a diradical having up to 20 carbon atoms;

the components $X^1$ are each independently of the others —O—, —NH— or a single bond; and X is NH or a single bond.

$R^3$ is, for example, alkenyl in the form of a radically polymerisable group having preferably from 2 to 12 carbon atoms. Examples of alkenyl are vinyl, allyl, 1-propen-2-yl, 1-buten-2- or -3- or -4-yl, 2-buten-3-yl, and the isomers of pentenyl, hexenyl, octenyl, decenyl and dodecenyl. $R^3$ preferably contains from 2 to 12, especially from 2 to 8 and very especially from 2 to 4, carbon atoms.

The diiradical B is, for example, lower alkylene, arylene, a saturated divalent cycloaliphatic group having from 6 to 12 carbon atoms, alkylenearylene, arylenealkylene or arylene-alkylenearylene.

A vinylic crosslinking agent (d) that is preferably used is, for example, a compound of formula (II) wherein the polymerisable group $R^3$ is alkenyl having from 2 to 8 carbon atoms; n, m and p are each independently of the others zero or 1; the components B are each independently of the other lower alkylene, arylene, a saturated divalent cycloaliphatic group having from 6 to 12 carbon atoms, alkylenearylene, arylenealkylene or arylenealkylenearylene; the components $X^1$ are each independently of the others —O—, —NH— or a single bond; and X is NH or a single bond.

A vinylic crosslinking agent (d) that is preferably used is, for example, a compound of formula (II) wherein the polymerisable group $R^3$ is alkenyl having from 2 to 8 carbon atoms; n, m and p are each independently of the others zero or 1; the components B are each independently of the other lower alkylene, arylene, a saturated divalent cycloaliphatic group having from 6 to 12 carbon atoms, alkylenearylene or arylenealkylene; the components $X^1$ are each independently of the others —O—, —NH— or a single bond; and X is NH or a single bond.

A vinylic crosslinking agent (d) that is preferably used is, for example, a compound of formula (II) wherein the polymerisable group $R^3$ is alkenyl having from 2 to 8 carbon atoms; n, m and p are each independently of the others zero or 1; the components B are each independently of the other lower alkylene, arylene or a saturated divalent cycloaliphatic group having from 6 to 12 carbon atoms; the components $X^1$ are each independently of the others —O—, —NH— or a single bond; and X is NH or a single bond.

A vinylic crosslinking agent (d) that is preferably used is also a compound of formula (II) wherein the polymerisable group $R^3$ is alkenyl having from 2 to 8 carbon atoms; n is 1 or 0; and m and p are zero.

An especially preferred vinylic crosslinking agent (d) is, for example, a compound of formula (II) wherein the polymerisable group $R^3$ is alkenyl having from 2 to 4 carbon atoms; m and n are 1 and p is 1 or 0; the components B are each independently of the other lower alkylene, arylene or a saturated divalent cycloaliphatic group having from 6 to 12 carbon atoms; the components $X^1$ are each independently of the others —O—, —NH— or a single bond; and X is NH or a single bond.

A very preferred vinylic crosslinking agent (d) is, for example, a compound of formula (II) wherein the polymerisable group $R^3$ is alkenyl having from 2 to 4 carbon atoms; m and n are 1 and p is 1 or 0; the components B are each independently of the other lower alkylene; the components $X^1$ are each independently of the others —O—, —NH— or a single bond; and X is NH or a single bond.

A vinylic photoinitiator (e) is to be understood as being, for example, a derivative of formula (III)

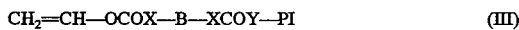

wherein the components X are each independently of the other NH or a single bond;

Y is —O—, —S— or —NH—;

B is a diradical having up to 20 carbon atoms; and

PI is a radical of a photoinitiator minus YH.

A preferred vinylic photoinitiator (e) is, for example, a compound of formula (III) wherein the components X are each independently of the other NH or a single bond; Y is —O— or —NH—; B is a diradical and is, for example, lower alkylene, arylene, a saturated divalent cycloaliphatic group having from 6 to 12 carbon atoms, alkylenearylene, arylenealkylene or arylenealkylenearylene; and PI is the radical of a photoinitiator according to formula (IV) minus YH.

A preferred vinylic photoinitiator (e) is also, for example, a compound of formula (III) wherein the components X are each independently of the other NH or a single bond; Y is —O—; B is a diradical and is, for example, lower alkylene, arylene, a saturated divalent cycloaliphatic group having from 6 to 12 carbon atoms, alkylenearylene, arylenealkylene or arylenealkylenearylene; and PI is the radical of a photoinitiator according to formula (IV) minus YH.

A preferred vinylic photoinitiator (e) is also a compound of formula (III) wherein the components X are each independently of the other NH or a single bond; Y is —O— or —NH—; B is a diradical and is, for example, lower alkylene, arylene or a saturated divalent cycloaliphatic group having from 6 to 12 carbon atoms; and PI is the radical of a photoinitiator according to formula (IV) minus YH.

A photoinitiator PI—YH is to be understood as being, for example, a compound of formula (IV)

$$HY-Z-X^1-\underset{R^4}{\underset{|}{\bigcirc}}\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!-\overset{O}{\overset{\|}{C}}- \quad (IV)$$

wherein
Y is —O—, —S— or —NH—;
$X^1$ is —O—, —NH— or a single bond;
Z is lower alkylene, arylene, a saturated divalent cycloaliphatic group having from 6 to 12 carbon atoms, alkylenearylene, arylenealkylene or arylenealkylenearylene; and
$R^4$ is a radical of formula (V)

$$\underset{R^7}{\overset{R^5}{\underset{|}{\overset{|}{-\!\!\!-\!\!\!-R^6}}}}\quad (V)$$

wherein
$R^5$ is lower alkyl or lower alkoxy;
$R^6$ is selected from lower alkyl, lower alkoxy and aralkyl; and
$R^7$ is hydroxy, di-lower alkylamino, aryl or azacyclooxaalkyl.

Preferred examples of radicals $R^4$ according to formula (V) are

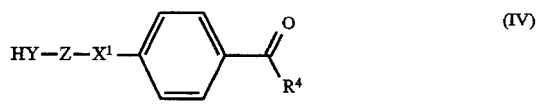

Special preference is given also to a vinylic photoinitiator (e) wherein the components X are each independently of the other NH or a single bond; Y is —O—; B is a diradical and is, for example, lower alkylene, arylene or a saturated divalent cycloaliphatic group having from 6 to 12 carbon atoms; and PI is the radical of Irgacure® 2959 minus the primary hydroxy group.

Within the scope of this invention, unless defined otherwise, the term "lower" in connection with radicals and compounds denotes especially radicals or compounds having up to 7 carbon atoms, preferably up to 4 carbon atoms.

Lower alkyl may be straight-chained or branched and has especially up to 7 carbon atoms, preferably up to 4 carbon atoms, and is, for example, methyl, ethyl, propyl, isopropyl, n-butyl, isobutyl or tert-butyl.

Accordingly, a lower alkanecarboxylic acid is to be understood as being a straight-chained or branched aliphatic carboxylic acid having up to 7 carbon atoms and preferably up to 4 carbon atoms. Examples are acetic acid, propionic acid and butyric acid.

Alkylene has up to 10 carbon atoms and may be straight-chained or branched. Suitable examples include decylene, octylene, hexylene, pentylene, butylene, propylene, ethylene, methylene, 2-propylene, 2-butylene and 3-pentylene. Alkylene is preferably lower alkylene.

Lower alkylene is alkylene having up to 7 and especially up to 4 carbon atoms. An especially preferred meaning of lower alkylene is methylene or ethylene.

Alkenylene has up to 10 carbon atoms and may be straight-chained or branched. Suitable examples include decenylene, octenylene, hexenylene, butenylene and ethenylene. Alkenylene is preferably lower alkenylene.

Lower alkenylene is alkenylene having up to 7 and especially up to 4 carbon atoms. An especially preferred meaning of lower alkenylene is ethenylene.

Aryl is, for example, naphthyl, pyridyl, thienyl or, preferably, phenyl that is unsubstituted or substituted by lower alkyl or by lower alkoxy.

Lower alkoxy has especially up to 7 carbon atoms, preferably up to 4 carbon atoms, and is, for example, methoxy, ethoxy, propoxy or tert-butoxy.

Aralkyl is preferably phenyl-lower alkyl having up to 4 carbon atoms in the alkyl moiety, for example 1- or 2-phenylethyl or benzyl.

Alkaryl is preferably lower alkylphenyl having up to 4 carbon atoms in the alkyl moiety, for example ethylphenyl, toluyl or xylyl.

Arylene is preferably phenylene that is unsubstituted or substituted by lower alkyl or by lower alkoxy, especially 1,3-phenylene or 1,4-phenylene or methyl-1,4-phenylene.

A saturated divalent cycloaliphatic group is preferably cyclohexylene or cyclohexylene-lower alkylene, for example cyclohexylenemethylene, that is unsubstituted or substituted by one or more lower alkyl groups, e.g. methyl groups, for example trimethylcyclohexylenemethylene, e.g. the divalent isophorone radical.

Cycloalkyl has especially up to 7 carbon atoms, preferably from 3 to 6 carbon atoms, and is, for example, cyclopropyl, cyclobutyl, cyclopentyl or cyclohexyl.

An azacyclooxaalkyl is to be understood as being an oxygen-containing saturated azacycloalkyl radical, wherein the oxygen is incorporated in the ring and azacycloalkyl is a nitrogen-containing cycloalkyl radical. A typical example of an azacyclooxaalkane is morpholine.

The present invention relates also to a process for the preparation of a prepolymer according to the invention, wherein there is advantageously used as starting material a suitable starting polymer. A suitable staring polymer is, for example, the polymerisation product of an N-vinyl lactam (a) and a lower alkanecarboxylic acid vinyl ester (c). Examples of such starting polymers are N-vinylpyrrolidone-vinyl acetate, N-vinylpyrrolidone-vinyl propionate or mixed esters, namely N-vinylpyrrolidone-vinyl acetate/vinyl propionate.

The last-mentioned starting polymers are available commercially with different average molecular weights and in different compositions.

Aldrich markets, for example, N-vinylpyrrolidone-vinyl acetate (VP-VAc) polymer in the form of a so-called 60/40 copolymer (60% by weight VP, 40% by weight VAc), which is a powder and has a molecular weight of $M_n=56\,000$. Aldrich also supplies VP-VAc 30/70 in isopropanol.

The molecular weights ($M_n$) are determined by means of gel permeation chromatography (GPC) {size exclusion chromatography (SEC)} using DMF as solvent and, unless indicated otherwise, relate to the calibration standard of polymethyl methacrylate (PMMA).

Another supplier of VP-VAc starting polymers is BASF. BASF sells those polymers under the name Luviskol VA. Examples are Luviskol VA 28, Luviskol VA 37 and Luviskol VA 73 having a molecular weight $M_n$ of from 7000 to 22000 (PMMA). Luviskol VA 37 HM is a high-molecular-weight starting polymer of $M_n=32000$ (PMMA). The numerical coding of the mentioned Luviskols indicates their composition. For example, Luviskol VA 28 means that it is a VP-VAc starting polymer containing approximately 20% by weight VP and approximately 80% by weight VAc.

The N-vinyl lactam (a)-lower alkanecarboxylic acid vinyl ester (c) starting polymers can be subjected to partial or complete acid or alkaline hydrolysis. Partial hydrolysis results in terprepolymers comprising the structural units vinyl lactam (a), vinyl alcohol (VA) (b) and lower alkanecarboxylic acid vinyl ester (c). Complete hydrolysis results in a starting polymer comprising the structural units vinyl lactam (a) and vinyl alcohol (VA) (b). Starting polymers so hydrolysed can then be derivatised in a suitable manner, for example with methacrylic acid chloride, with a 1:1 addition product of toluene diisocyanate (TDI) and HEMA with a 1:1 addition product of isophorone diisocyanate (IPDI) and HEMA or with isocyanatoethyl methacrylate (IEM). Derivatisation allows the nature and the amount of, for example, the crosslinking component (d) to be determined and incorporated in the prepolymer according to the invention.

In an analogous manner, an N-vinyl lactam (a)-vinyl alcohol (b) starting polymer, for example, can also be derivatised with a suitable precursor of a vinylic photoinitiator (e). Such a precursor is, for example, derived from formula (III) above, it being possible to formulate such a precursor by, for example, the formal subtraction of vinyl alcohol in formula (III). The derivatisation of the starting polymer to form a prepolymer comprising a photoinitiator component (e) may be carried out at the same time as the incorporation of the crosslinking component (d), or the two operations may be carried out in succession.

The molar mass of a prepolymer is determined primarily by suitable selection of the starting polymer, for example of a commercial N-vinylpyrrolidone-vinyl acetate prepolymer. The above-described derivatisation changes the molar mass comparatively only marginally and, in addition, can be controlled precisely by the choice of, for example, the crosslinking component and the degree of hydrolysis of the starting polymer. The molecular weights ($M_n$) of such prepolymers according to the invention generally vary in the range of $M_n$=from 2000 to 200000 g/mol. The molecular weight is preferably in the range of from 5000 to 200000 g/mol, and especially in the range of from 10000 to 100000 g/mol.

A prepolymer according to the invention can be prepared in the presence or absence of a solvent. Suitable solvents are in principle all those that dissolve both a starting polymer and a prepolymer to be prepared and that are substantially inert with respect thereto. Examples of suitable solvents are water, alcohols, such as lower alkanols, for example ethanol or methanol, also carboxylic acid amides, such as dimethylformamide (DMF) or dimethylacetamide (DMA), ethers, for example diethyl ether, tetrahydrofuran (THF) or diethylene glycol dimethyl ether (diglyme), also dimethyl sulfoxide, as well as mixtures of suitable solvents, for example mixtures of an alcohol with an ether, for example ethanol/THF, or methanol/diethyl ether. There are preferably used lower alkanols, carboxylic acid amides or dimethyl sulfoxide.

In the preparation of a prepolymer according to the invention, in particular during and after the incorporation of the crosslinking component (d) and especially of the photoinitiator component (e), operations should be carried out with the exclusion of light in order to avoid uncontrolled and premature crosslinking. In addition, it is advantageous for the synthesis of a prepolymer according to the invention to be carried out without the exclusion of atmospheric oxygen or, where appropriate, with the addition of atmospheric oxygen, since the oxygen acts as a radical acceptor during the synthesis. Any free radicals present are captured and uncontrolled crosslinking is thus inhibited. The oxygen therefore has a stabilising effect.

The composition of a prepolymer according to the invention, once crosslinked, determines the properties of a resulting moulded article, for example a hydrogel contact lens. The crosslinking component (d) in a prepolymer can be used especially to control the mechanical properties of a contact lens. The water content, for example, of a hydrogel contact lens is controlled, for example, by the content of vinyl lactam (a) or vinyl alcohol (b) in the prepolymer.

After preparation, a prepolymer according to the invention can be purified by the customary methods, for example by reprecipitation, filtration, removal of residual monomers in vacuo, where appropriate at elevated temperature. A solvent, where used, can be removed in a rotary evaporator or by pouring out and drying a film in the air or in vacuo. An especially elegant method is purification by ultrafiltration in order to remove low-molecular-weight fractions and at the same time adjust the desired concentration of the aqueous prepolymer solution in a simple manner.

The present invention relates also to the manufacture of hydrogel contact lenses that have a desired geometry and a desired water content and are obtainable from an aqueous solution in seconds, comprising the following steps: dissolving an uncrosslinked prepolymer in water and then crosslinking it in a suitable manner, for example in a mould. The obvious advantages are:

residual monomers are as a rule removed at the stage of the uncrosslinked prepolymer;

the conversion in the crosslinking is substantially lower since the polymeric network is composed of prepolymers and not of monomers;

the reaction times are very short; in general, they do not exceed one minute and are typically less than 20 seconds; and lengthy extraction of the contact lens with water is no longer necessary, since crosslinking can be carried out in water.

Accordingly, for the crosslinking of a prepolymer according to the invention, an aqueous solution is advantageously prepared. If a solvent has been used in the synthesis of a prepolymer, it can be removed completely first or alternatively it can be removed only after the addition of a corresponding mount of water. The concentration of a prepolymer solution is preferably such that the water content of the solution is as close as possible to that of a finished contact lens. In a preferred manufacturing process, the water content of an aqueous prepolymer solution corresponds exactly to the water content (in % by weight) of a crosslinked prepolymer, that is to say of a hydrogel.

The crosslinking of a prepolymer to form the hydrogel is generally carried out independently of its synthesis and can be effected by various methods.

A first method consists in exposing a prepolymer according to the invention to a suitable high-energy radiation, for example electron or gamma rays, actinic or UV radiation of a suitable wavelength, which produces radicals in the prepolymer. Those radical-containing prepolymers are able to react to form polymeric networks. With this crosslinking method, no special requirements are made in respect of the nature of an uncrosslinked prepolymer according to the invention, that is to say the presence of a vinylic crosslinking agent (d), for example, is not necessary.

In the case of photocrosslinking, a suitable photoinitiator that is able to initiate radical crosslinking is added, if necessary. Examples thereof are known to the person skilled in the art. There may be mentioned as representative examples: benzoin methyl ether, 1-hydroxycyclohexyl phenyl ketone, Darocur and Irgacure types, preferably Darocur 1173® and Irgacure 2959®. The crosslinking can then be initiated by UV light of a suitable wavelength.

A preferred method of crosslinking is the photocrosslinking of prepolymers that include a vinylic photoinitiator component (e). Such a prepolymer is especially suitable for crosslinking directly, without the addition of a further photoinitiator.

Crosslinking is expediently carried out in a solvent. Suitable solvents are in principle all solvents that dissolve the prepolymers used, for example water, alcohols, such as lower alkanols, for example ethanol or methanol, also carboxylic acid amides, such as dimethylformamide, or dimethyl sulfoxide, as well as mixtures of suitable solvents, for example mixtures of water with an alcohol, e.g. a water/ethanol or a water/methanol mixture. Also suitable are aqueous solutions containing alkali metal or alkaline earth metal halides, for example NaCl or $CaCl_2$. There is preferably used, for example, a physiological saline containing approximately 0.9% by weight NaCl.

The crosslinking is preferably carried out directly from an aqueous solution of a prepolymer according to the invention. Such an aqueous solution can also be obtained directly as a result of a preferred purification step, for example ultrafiltration. For example, crosslinking, preferably photocrossing, of an approximately from 10 to 50% by weight aqueous solution can be carried out.

The present invention relates also to a polymeric network consisting essentially of a prepolymer disclosed according to the main claim in crosslinked form.

The present invention relates also to a hydrogel consisting essentially of a prepolymer disclosed according to the main claim in crosslinked form.

The invention relates preferably to a hydrogel consisting essentially of a prepolymer according to the definition given in the main claim in crosslinked form, the hydrogel being a contact lens.

The invention also relates preferably to a contact lens consisting essentially of a prepolymer disclosed according to the main claim in the crosslinked state.

The present invention relates also to a contact lens obtainable by crosslinking a prepolymer disclosed according to the main claim.

The present invention relates also to a moulded article consisting essentially of a prepolymer according to the definition given in the main claim in the crosslinked state.

Examples of moulded articles according to the invention, in addition to contact lenses, are biomedicinal articles and, especially, ophthalmic raouldeal articles, for example artificial corneas, intraocular lenses, eye dressings, moulded articles for use in surgery, such as heart valves, artificial arteries or the like, and also fibres, films or membranes, for example membranes for diffusion control, photostructurable foils for information storage, or photoresist materials, for example membranes or moulded articles for etching resists or screen printing resists.

The Examples given below serve to illustrate the present invention in greater detail; however, they are not intended to limit the scope thereof in any way. Temperatures are given in degrees Celsius.

EXAMPLE 1

General procedure for the acid hydrolysis of VP-VAc prepolymers

Luviskol VA (BASF) or VP-VAc copolymer (Aldrich) having a VP content by weight of from 18 to 70%, in the form of a 10% by weight solution in methanol or in methanol/water (10–90% water), is used. There is then added thereto an equimolar amount, corresponding to the amount of VAc, of acid, namely concentrated sulfuric acid (95%), concentrated hydrochloric acid (37%) or strongly acidic ion exchanger, and the mixture is then heated to reflux temperature. The progress of the reaction is monitored by periodic sampling and titration with 0.1N KOH solution (e.g. Titrator DL 40 from Mettler) (determination of the concentration of the acetic acid that is formed). The hydrolysis is then stopped either when the desired degree of hydrolysis has been achieved or when the hydrolysis is complete (concentration of acetic acid reaches a constant value). A reaction time of from 1 to 2 days is required for complete hydrolysis. Complete hydrolysis does not necessarily mean that all hydrolysable ester groups have been removed, but rather that the hydrolysis has come to a standstill. The following Examples show clearly that the degree of hydrolysis is greatly dependent upon the reaction conditions. In order to remove the acetic acid, the methanolic reaction solution is subsequently passed over a column containing basic ion exchanger (Merck; 1.2 molar relative to the acid used) that has been washed until neutral, and is concentrated in a rotary evaporator. The concentrated solution is poured out in the form of a film and is dried for several days in the air and then at 40° C. and 0.1 mbar (10 Pa) until a constant weight is reach, ed. Alternatively, the concentrated solution can be diluted with water and freed of residual alcohol in a rotary evaporator; then the aqueous solution that remains is spray-dried. The prepolymers so obtained are readily soluble in water, alcohols (lower alkanols), dimethylformamide (DMF), N,N-dimethylacetamide (DMA) and dimethyl sulfoxide (DMSO).

EXAMPLE 2

50 g of a VP-VAc copolymer 60/40 (Aldrich), containing 61% by weight VP and 39% by weight VAc, are dissolved in 450 g of methanol, and 12 g of 95% by weight sulfuric acid are added with vigorous stirring. The mixture is heated under reflux for 2 days (bath temperature 80°). The reaction solution is cooled to room temperature and then eluted over a column containing 190 g of strongly basic ion exchanger. The methanolic solution is then concentrated to a volume of approximately 100 ml by evaporation, is poured out in the form of a film, and is dried for several days in the air and then at 40° C. and 0.1 mbar (10 Pa) until a constant weight is reached. There remains a solid, 20.3 g (yield: 62% by weight), the OH content of which is 4.83 mmol/g of prepolymer. The degree of hydrolysis of VAc is approximately 90%.

EXAMPLE 3

120 g of Luviskol VA 37 (BASF) (50.4% by weight in ethanol), containing 28% by weight VP and 72% by weight VAc, are diluted with 480 g of methanol, and then 48 g of 37% by weight hydrochloric acid are added with stinging. The mixture is heated under reflux for one day (bath temperature 80°). The reaction solution is cooled to room temperature and then eluted over a column containing 360 g of strongly basic ion exchanger. The methanolic solution is then concentrated to a volume of approximately 100 ml by evaporation, is poured out in the form of a film and is dried for several days in the air and then at 40° C. and 0.1 mbar (10 Pa) until a constant weight is reached. There remains a solid, the OH content of which is 7.12 mmol/g of prepolymer. The degree of hydrolysis of VAc is approximately 66.5%.

EXAMPLE 4

General procedure for the alkaline hydrolysis of VP-VAc prepolymers

Luviskol VA (BASF) or VP-VAc copolymer (Aldrich) having a VP content by weight of from 18 to 70%, in the form of a 10% by weight solution in methanol or in methanol/water (10–90% water), is used. There is then added thereto an equimolar amount, corresponding to the amount of VAc, of alkaline solution, namely sodium hydroxide or potassium hydroxide or strongly basic ion exchanger, and the mixture is then heated to reflux temperature. The progress of the reaction is monitored by periodic sampling and titration with 0.1N HCl solution (e.g. Titrator DL 40 from Mettler) (determination of the concentration of the sodium acetate that is formed). The hydrolysis is then stopped either when the desired degree of hydrolysis has been achieved or when the hydrolysis is complete (concentration of sodium acetate reaches a constant value). A reaction time of from 1 to 2 days is required for complete hydrolysis. Complete hydrolysis does not necessarily mean that all hydrolysable ester groups have been removed, but rather that the hydrolysis has come to a standstill. The following Examples again show that the degree of hydrolysis is greatly dependent upon the reaction conditions. In order to remove the base, the methanolic reaction solution is subsequently passed over a column containing acidic ion exchanger (Merck; 1.2 molar relative to the base used) that has been washed until neutral, and is then passed over a column containing basic ion exchanger for the final removal of the sodium acetate. Concentration is then carried out in a rotary evaporator. The concentrated solution is poured out in the form of a film and is dried for several days in the air and then at 40° C. and 0.1 mbar (10 Pa) until a constant weight is reached. Alternatively, the concentrated solution can be diluted with water and freed of residual alcohol in a rotary evaporator; then the aqueous solution that remains is spraydried. A powdered end product is obtained. The prepolymers so obtained are readily soluble in water, alcohols (lower alkanols), dimethylformamide (DMF), N,N-dimethylacetamide (DMA) and dimethyl sulfoxide (DMSO).

EXAMPLE 5

50 g of a VP-VAc copolymer 60/40 (Aldrich), containing 61% by weight VP and 39% by weight VAc, are dissolved in 450 g of methanol, and 9.3 g of sodium hydroxide are added with vigorous stirring. The mixture is heated under reflux for 30 hours (bath temperature 80°). The reaction solution is cooled to room temperature and is then eluted in succession over a strongly acidic column (120 g of ion exchanger) and a strongly basic column (155 g of ion exchanger). The methanolic solution is then concentrated to a volume of approximately 80 ml by evaporation, is poured out in the form of a film and is dried for several days in the air and then at 40° C. and 0.1 mbar (10 Pa) until a constant weight is reached. There remains a solid, 22.4 g (yield: 56% by weight), the OH content of which is 5.18 mmol/g of prepolymer. The degree of hydrolysis of VAc is approximately 95%.

EXAMPLE 6

92 g of Luviskol VA 55 (BASF) (54.4% by weight in ethanol), containing 45% by weight VP and 55% by weight VAc, are diluted with 408 g of methanol, and then 11.6 g of sodium hydroxide are added with stirring. The mixture is heated under reflux for one day (bath temperature 80°). The reaction solution is cooled to room temperature and is then eluted in succession over a strongly basic column (150 g of ion exchanger) and a strongly acidic column (200 g of ion exchanger). The methanolic solution is then concentrated to a volume of approximately 100 ml by evaporation, is poured out in the form of a film and is dried for several days in the air and then at 40° C. and 0.1 mbar (10 Pa) until a constant weight is reached. There remains a solid, 30 g (yield: 72% by weight), the OH content of which is 4.91 mmol/g of prepolymer. The degree of hydrolysis of VAc is approximately 70%.

EXAMPLE 7

10 g of a terpolymer prepared in accordance with Example 1 or 3, containing 74% by weight VP, 4% by weight VAc and 21% by weight VA, are dissolved in 90 g of anhydrous DMSO. 2 g of IEM are added thereto at room temperature, with stirring, and the mixture is then heated at 40° C. for 21 hours. After the indicated reaction time, an IR spectroscopic measurement exhibits no NCO band at 2270 $cm^{-1}$. The reaction solution is then introduced slowly into one liter of acetone, with stirring, whereupon a white flocculent precipitate forms. The latter is filtered off with suction, washed with acetone and then dried (30° C., 10 Pa) until a constant weight is reached. There remain 6.9 g of a solid (yield: 58% by weight).

EXAMPLE 8

5.2 g of a terpolymer prepared in accordance with Example 1 or 3, containing 26% by weight VP, 16% by weight VAc and 58% by weight VA, are dissolved in 47 g of anhydrous DMSO. 1.3 g of IEM are added thereto at room temperature, with stirring, and the mixture is then heated at 40° C. for 18 hours. After the indicated reaction time, an IR spectroscopic measurement exhibits no NCO band at 2270 $cm^{-1}$. The reaction solution is then introduced slowly into half a liter of acetone, with stirring, whereupon a white flocculent precipitate forms. The latter is filtered off with suction, washed with acetone and then dried (30° C., 10 Pa) until a constant weight is reached. There remain 4.5 g of a solid (yield: 69% by weight).

EXAMPLE 9

4.13 g of a terpolymer prepared in accordance with Example 1 or 3, containing 28% by weight VP, 21% by weight VAc and 51% by weight VA, are dissolved in 37.3 g of DMA, and 0.6 g (5.9 mmol) of anhydrous triethylamine is added. 0.62 g (5.9 mmol) of methacrylic acid chloride is added at room temperature, with stirring, and the mixture is then heated at 40° C. for 25 hours (end point determination by means of titration, acid chloride determination with 0.1N NaOH). The reaction solution is then introduced slowly into half a liter of acetone, with stirring, whereupon a white flocculent precipitate forms. The latter is filtered off with suction, washed with acetone and then dried (30° C., 10 Pa) until a constant weight is reached. Care must be taken to ensure that light is strictly excluded. There remain 2.7 g of a solid (yield: 60% by weight). The prepolymer so modified is readily soluble in water, alcohol, DMF, DMA and DMSO.

EXAMPLE 10

0.3% by weight Irgacure®2959 (calculated relative to the polymer content) is added to aqueous solutions of modified prepolymers prepared in accordance with Examples 8 and 9. Contact lens moulds are filled with those solutions, are sealed, and are then irradiated using a Hönle Hg medium-pressure lamp (3200 W). The irradiation intensity is from 50 to 100 mW/cm$^2$, measured using a Hönle UV-C detector in a wavelength range of from 200 to 280 nm. Crosslinking of the prepolymers takes place commencing after one second.

EXAMPLE 11

Various terpolymers having different VP, VAc and VA contents are modified with IEM analogously to Example 8 and are then crosslinked analogously to Example 10. The Table below indicates the composition and the water content of such hydrogels.

| % content of VP | % content of VA | % content of crosslinking agent (VA-IEM) | % water content of the hydrogel |
|---|---|---|---|
| 23 | 55 | 6 | 74 ± 2 |
| 44 | 21 | 9 | 76 ± 2 |
| 69 | 18 | 8 | 74 ± 2 |
| 38 | 30 | 17 | 67 ± 2 |
| 45 | 22 | 5 | 80 ± 2 |
| 22 | 52 | 11 | 70 ± 2 |
| 33 | 18 | 30 | 62 ± 2 |

EXAMPLE 12

Analogously to Example 11, various crosslinked polymers having the compositions indicated below are prepared in the form of small disks (as a small disk mould). The Table below indicates their composition as well as their water content.

| VP | VAc | VA | crosslinking agent (VA-IEM) | water content |
|---|---|---|---|---|
| 38 | 15 | 30 | 17 | 67% |
| 40 | 17 | 29 | 14 | 70% |
| comparison contact lenses | | | | |
| Weicon 38 E (Poly-HEMA) | | | | 38% |
| New Vues ® | | | | 59% |

EXAMPLE 13 Preparation of

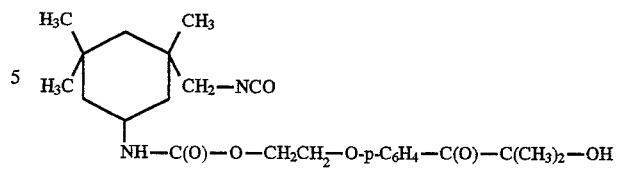

In a 500 ml flask equipped with a reflux condenser, a thermometer, a stirrer and a nitrogen inlet pipe, a solution of 11.125 g (0.05 mol) of freshly distilled isophorone diisocyanate (IPDI) in 50 ml of dry methylene chloride is mixed, under nitrogen, with a solution of 11.2 g (0.05 mol) of 4'-(β-hydroxyethoxy)-2-hydroxyprop-2-yl-phenone (Irgacure 2959®) in 300 ml of dry methylene chloride, and the mixture is stirred at 40° C. for 48 hours. The progress of the reaction is monitored by means of thin-layer chromatography on silica gel plates (60 F$_{254}$, art. 5719 Merck) (eluant: toluene/acetonitrile 7:3). The resulting product is freed of small amounts of unreacted Irgacure®2959 and bisadduct of IPDI by column chromatography on silica gel 60 (eluant: toluene/acetonitrile 7:3). Concentration of the pure fractions by evaporation in a rotary evaporator yields a colourless oil which crystallises slowly when cooled to −16° C. and is then recrystallised from dry diethyl ether. 15.6 g of a white crystalline product (70% of the theoretical yield) having a melting point of 76° C. are obtained.

The isocyanate content of the product is determined by titration with dibutylamine in toluene: calculated 2.242 mVal/g, found 2.25 mVal/g. The method is described in "Analytical Chemistry of Polyurethanes" (High Polymer Series XVI/Part III, D. S. David+H. B. Staley editors, Interscience Publishers, New York 1969 p. 86).

EXAMPLE 14

With the exclusion of light and analogously to Example 8, 4.07 g of a terpolymer prepared in accordance with Example 1 or 3, containing 28% by weight VP, 21% by weight VAc and 51% by weight VA, are dissolved in 40 g of anhydrous DMSO. A solution of 1.02 g of IEM and 18.3 g of photoinitiator derivative from Example 13 in 6 ml of DMSO are added thereto at room temperature, with stirring, and the mixture is then heated at 40° C. for 18 hours. After the indicated reaction time, an IR spectroscopic measurement exhibits no NCO band at 2270 cm$^{-1}$. The reaction solution is then introduced slowly (still with the exclusion of light) into half a liter of acetone, with stirring, whereupon a white flocculent precipitate forms. The latter is filtered off with suction, washed with acetone and then dried (30° C., 10 Pa) until a constant weight is reached. There remain 3.71 g of a solid (yield: 73% by weight). The prepolymer so modified is readily soluble in water, alcohol, DMF, DMA and DMSO.

What is claimed is:

1. A water-soluble crosslinkable prepolymer that comprises, in the copolymer chain, units derived from the following monomeric structural units: a vinyl lactam (a), vinyl alcohol (b), optionally a lower alkanecarboxylic acid vinyl ester (c), a vinylic crosslinking agent (d) and optionally a vinylic photoinitiator (e).

2. A prepolymer according to claim 1, comprising from 5 to 85% by weight of a vinyl lactam (a), from 3 to 80% by weight of vinyl alcohol (b), from 0 to 65% by weight of a lower alkanecarboxylic acid vinyl ester (c), from 3 to 40% by weight of a vinylic crosslinking agent (d) and from 0 to 5% by weight of a vinylic photoinitiator (e).

3. A prepolymer according to claim 1, comprising from 10 to 75% by weight of a vinyl lactam (a), from 10 to 65% by weight of vinyl alcohol (b), from 2 to 40% by weight of a lower alkanecarboxylic acid vinyl ester (c), from 5 to 35% by weight of a vinylic crosslinking agent (d) and from 0 to 3% by weight of a vinylic photoinitiator (e).

4. A prepolymer according to claim 1, comprising from 20 to 70% by weight of a vinyl lactam (a), from 15 to 60% by weight of vinyl alcohol (b), from 5 to 30% by weight of a lower alkanecarboxylic acid vinyl ester (c), from 7 to 30% by weight of a vinylic crosslinking agent (d) and from 0 to 2% by weight of a vinylic photoinitiator (e).

5. A prepolymer according to claim 1, wherein the vinyl lactam (a) is a five- to seven-membered lactam of formula (I)

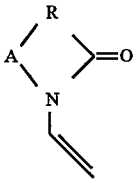
(I)

wherein

R is alkylene or alkenylene having from 2 to 8 carbon atoms that is linear or has one or more branches, and A is CO or $CR^1R^2$, wherein $R^1$ is hydrogen, lower alkyl, aryl, aralkyl or alkaryl and $R^2$ is hydrogen or lower alkyl.

6. A prepolymer according to claim 5, wherein the vinyl lactam (a) contains from 4 to 6 carbon atoms in the heterocyclic ring.

7. A prepolymer according to claim 5, wherein the vinyl lactam (a) contains 4 carbon atoms in the heterocyclic ring.

8. A prepolymer according to claim 5, wherein the vinyl lactam (a) contains 4 carbon atoms in the heterocyclic ring and wherein $R^1$ is hydrogen or lower alkyl.

9. A prepolymer according to claim 5, wherein the vinyl lactam (a) contains 4 carbon atoms in the heterocyclic ring and wherein $R^1$ and $R^2$ are each independently of the other hydrogen or lower alkyl.

10. A prepolymer according to claim 1, wherein the lower alkanecarboxylic acid vinyl ester is vinyl acetate, vinyl propionate or a mixture of the mentioned esters.

11. A prepolymer according to claim 1, wherein the vinylic crosslinking agent (d) is a derivative of formula (II)

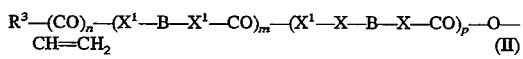

wherein $R^3$ is a radically polymerisable hydrocarbon group;

n, m and p are each independently of the others zero or 1;

the components B are each independently of the other a diradical having up to 20 carbon atoms;

the components $X^1$ are each independently of the others —O—, —NH— or a single bond; and X is NH or a single bond.

12. A prepolymer according to claim 11, wherein $R^3$ is alkenyl having from 2 to 12 carbon atoms, preferably alkenyl having from 2 to 8 carbon atoms and especially alkenyl having from 2 to 4 carbon atoms.

13. A prepolymer according to claim 11, wherein the diradical B is independently of the other lower alkylene, arylene, a saturated divalent cycloaliphatic group having from 6 to 12 carbon atoms, alkylenearylene, arylenealkylene or arylenealkylenearylene.

14. A prepolymer according to claim 11, wherein $R^3$ is alkenyl having from 2 to 8 carbon atoms; n, m and p are each independently of the others zero or 1; the components B are each independently of the other lower alkylene, arylene, a saturated divalent cycloaliphatic group having from 6 to 12 carbon atoms, alkylenearylene, arylenealkylene or arylenealkylenearylene; the components $X^1$ are each independently of the others —O—, —NH— or a single bond; and X is NH or a single bond.

15. A prepolymer according to claim 11, wherein $R^3$ is alkenyl having from 2 to 8 carbon atoms; n, m and p are each independently of the others zero or 1; the components B are each independently of the other lower alkylene, arylene, a saturated divalent cycloaliphatic group having from 6 to 12 carbon atoms, alkylenearylene or arylenealkylene; the components $X^1$ are each independently of the others —O—, —NH— or a single bond; and X is NH or a single bond.

16. A prepolymer according to claim 11, wherein $R^3$ is alkenyl having from 2 to 8 carbon atoms; n, m and p are each independently of the others zero or 1; the components B are each independently of the other lower alkylene, arylene or a saturated divalent cycloaliphatic group having from 6 to 12 carbon atoms; the components $X^1$ are each independently of the others —O—, —NH— or a single bond; and X is NH or a single bond.

17. A prepolymer according to claim 11, wherein $R^3$ is alkenyl having from 2 to 8 carbon atoms; n is 1 or 0; and m and p are zero.

18. A prepolymer according to claim 11, wherein $R^3$ is alkenyl having from 2 to 4 carbon atoms; m and n are 1 and p is 1 or 0; the components B are each independently of the other lower alkylene, arylene or a saturated divalent cycloaliphatic group having from 6 to 12 carbon atoms; the components $X^1$ are each independently of the others —O—, —NH— or a single bond; and X is NH or a single bond.

19. A prepolymer according to claim 1, wherein the vinylic photoinitiator (e) is a derivative of formula (III)

$$CH_2=CH—OCOX—B—XCOY—PI \qquad (III)$$

wherein the components X are each independently of the other NH or a single bond;

Y is —O—, —S— or —NH—;

B is a diradical having up to 20 carbon atoms; and

PI is a radical of a photoinitiator minus YH.

20. A prepolymer according to claim 19, wherein the components X are each independently of the other NH or a single bond; Y is —O— or —NH—; B is a diradical and is, for example, lower alkylene, arylene, a saturated divalent cycloaliphatic group having from 6 to 12 carbon atoms, alkylenearylene, arylenealkylene or arylenealkylenearylene; and PI is the radical of a photoinitiator according to formula (IV) minus YH.

21. A prepolymer according to claim 19, wherein the components X are each independently of the other NH or a single bond; Y is —O—; B is a diradical and is, for example, lower alkylene, arylene, a saturated divalent cycloaliphatic group having from 6 to 12 carbon atoms, alkylenearylene, arylenealkylene or arylenealkylenearylene; and PI is the radical of a photoinitiator according to formula (IV) minus YH.

22. A prepolymer according to claim 19, wherein the components X are each independently of the other NH or a single bond; Y is —O— or —NH—; B is a diradical and is, for example, lower alkylene, arylene or a saturated divalent cycloaliphatic group having from 6 to 12 carbon atoms; and PI is the radical of a photoinitiator according to formula (IV) minus YH.

23. A prepolymer according to claim 19, wherein the photoinitiator PI—YH is a compound of formula (IV)

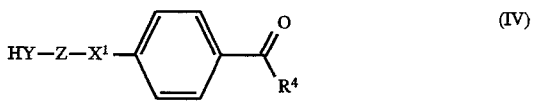

wherein

Y is —O—, —S— or —NH—;

X$^1$ is —O—, —NH— or a single bond;

Z is lower alkylene, arylene, a saturated divalent cycloaliphatic group having from 6 to 12 carbon atoms, alkylenearylene, arylenealkylene or arylenealkylenearylene; and R$^4$ is a radical of formula (V)

wherein

R$^5$ is lower alkyl or lower alkoxy;

R$^6$ is selected from lower alkyl, lower alkoxy and aralkyl; and

R$^7$ is hydroxy, di-lower alkylamino, aryl or azacyclooxaalkyl.

24. A prepolymer according to claim 23, wherein the radical R$^4$ is selected from

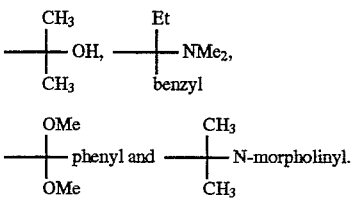

25. A process for the preparation of a prepolymer according to claim 1, which comprises subjecting a vinyl lactam (a)-lower alkanecarboxylic acid vinyl ester (c) prepolymer to partial or complete acid or alkaline hydrolysis and then derivatising it in a suitable manner, either at the same time or in succession, with a compound derived from a crosslinking component (d) and, optionally, with a compound derived from a vinylic photoinitiator component (e).

26. A hydrogel consisting essentially of a prepolymer disclosed according to claim 1 in crosslinked form.

27. A polymeric network consisting essentially of a prepolymer disclosed according to claim 1 in crosslinked form.

28. A hydrogel consisting essentially of a prepolymer according to the definition given in claim 1 in crosslinked form, the hydrogel being a contact lens.

29. A contact lens consisting essentially of a prepolymer disclosed according to claim 1 in the crosslinked state.

30. A contact lens obtainable by crosslinking a prepolymer according to claim 1.

31. A moulded article consisting essentially of a prepolymer according to the definition given in claim 1 in the crosslinked state.

32. A moulded article according to claim 31 that is a contact lens.

* * * * *